Patented June 30, 1936

2,045,791

UNITED STATES PATENT OFFICE 2,045,791

PREPARATION FOR TREATING PLANTS

Edward P. Naus, Minneapolis, Minn.

No Drawing. Application July 29, 1933,
Serial No. 682,887

3 Claims. (Cl. 167—29)

This invention relates to an improved preparation for treating plants, trees, and shrubbery, and more particularly to a preparation for exterminating potato bugs, aphides, and practically all species of insects, whether of the eating or sucking kind, which are destructive to plant life.

Growers of vegetables, fruits, trees, shrubbery, and the like, have long sought a preparation or compound which might be universally used for exterminating practically all kinds of bugs, insects, and fungi, which are destructive to the growth and development of plant life, which may be used with utmost safety; can readily be applied to the plants or trees to be treated; and which is inexpensive. Various preparations and compounds are now found on the market, but to the best of my knowledge, none of them fully meet the requirements sought.

It is therefore an object of the present invention to provide a preparation which may be universally used for exterminating insects and protecting plant life, and which will adequately meet the requirements hereinbefore mentioned.

A further object of the invention is to provide a preparation of the above character, composed principally of a suitable pulverized pitch with which other ingredients may be mixed to provide the desired results.

A further object is to provide a preparation for treating plants, trees, shrubbery, and the like, to rid them of insects and various plant diseases, and which also acts as a fertilizer to various plants.

A further object is to provide a preparation of the class described in the form of a fine dry powder, which may be dusted directly onto the plants; or it may be mixed with a suitable liquid and wet sprayed onto the plants, and said preparation, whether in dust or liquid form, having the inherent characteristic of adhering to the leaves and stalks of the plants in the form of a coating which is not readily removed from the plants by winds and rains.

The invention consists primarily of applying the pitch directly onto the plants by dusting it thereon in the form of a fine, dry powder or dust, or it may be applied thereto as a wet spray, by mixing it with a suitable liquid such as water, to which a small percent of alcohol or other material has been added which acts to hold the powdered pitch in suspension in the liquid.

The herein described preparation has been found very effective for exterminating potato bugs. In many cases, a single application during the season has been found sufficient, primarily because of the inherent characteristic of the preparation to adhere to the plants, regardless of winds and rains, and further because the preparation has the ability to retain its destructive effects upon bugs and insects for a long period of time.

The preparation has proven equally effective in the extermination of other insects such as aphides and small plant lice of the sucking kind, found on various kinds of plants, shrubbery and trees, and which, on account of their numbers, often do great damage.

The preparation is composed principally of finely ground or pulverized coal tar or asphaltum pitch. This material is reduced to a fine dust-like powder in which state it may be kept in storage indefinitely without deteriorating. It is preferably applied to the plants in a dry state, and may readily be dusted on by hand, or it may be blown onto the plants by any suitable apparatus applicable for the purpose. It may also be applied to the plants as a wet spray by mixing the powdered pitch into a suitable liquid, such for example, as water.

Pitch is a by-product resulting from the distillation of coal tar, wood tar, and various other materials. It is naturally of a viscous nature, which characteristic it retains even when compounded into my improved preparation. This viscous nature of the pitch adds to its usefulness in a preparation for treating plants, trees, and shrubs, as it causes it to adhere or bond itself to the plants onto which it is applied, regardless of whether it is applied as a dry dust or as a wet spray. Also, because of the adherent qualities of the preparation, it can be applied to the plants with equal results, whether the plants are wet or dry, which is quite an advantage, as it eliminates the necessity of having to mix therewith, a suitable spreader, such as soap suds, to cause it to adhere to the leaves and stalks of the plants, and which is customary when using most other preparations or compounds of a similar character.

The preparation is inexpensive, and embodies all of the qualities desirable in a product of this character. It is readily applied to the plants, and because of its tendency to adhere thereto for a considerable length of time, regardless of the elements, and still retain its effectiveness, it greatly reduces the cost of treating the plants, for in many cases, a single application has been found sufficient for an entire season.

What I claim, and desire to secure by Letters Patent, is

1. A preparation for treating plants, trees and shrubs against the ravages of bugs, insects and plant diseases, consisting of a finely pulverized coal tar pitch which is dusted or blown directly onto the plants, and has the inherent characteristic of adhering thereto for an indefinite period.

2. A preparation for treating plants, trees and shrubs against the ravages of bugs, insects and plant diseases composed substantially entirely of coal tar pitch, finely pulverized to reduce it to powder form, whereby it may readily be applied to the plants, trees and shrubs in the form of a dry dust-like powder which readily adheres thereto.

3. A preparation for treating plants, trees and shrubs against the ravages of bugs, insects and plant diseases, comprising finely pulverized coal tar pitch adapted to be applied to the plants.

EDWARD P. NAUS.